United States Patent
Stringham (10) Patent No.: US 7,095,513 B2
(45) Date of Patent: Aug. 22, 2006

(54) METHOD AND APPARATUS FOR LANGUAGE TRANSLATION OF PRODUCTION JOB OUTPUT

(75) Inventor: Gary Stringham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 09/976,078

(22) Filed: Oct. 11, 2001

(65) Prior Publication Data

US 2003/0072021 A1 Apr. 17, 2003

(51) Int. Cl.
G06F 17/28 (2006.01)
G06F 3/12 (2006.01)

(52) U.S. Cl. .............................. 358/1.13; 704/2; 704/3; 358/1.15

(58) Field of Classification Search ............... 358/1.15, 358/1.13, 1.9, 1.11; 704/1; 700/2, 3, 4
See application file for complete search history.

(56) References Cited

U.S. PATENT DOCUMENTS

| | | | |
|---|---|---|---|
| 5,175,684 A * | 12/1992 | Chong | 704/3 |
| 5,568,383 A * | 10/1996 | Johnson et al. | 704/2 |
| 6,424,983 B1 * | 7/2002 | Schabes et al. | 715/533 |
| 6,473,728 B1 * | 10/2002 | Tognazzini | 704/3 |
| 6,592,275 B1 * | 7/2003 | Aihara et al. | 400/62 |
| 6,639,687 B1 * | 10/2003 | Neilsen | 358/1.14 |
| 2002/0077805 A1 * | 6/2002 | Hecht et al. | 704/2 |
| 2002/0188435 A1 * | 12/2002 | Labarge | 704/1 |

FOREIGN PATENT DOCUMENTS

EP 0917041 5/1999

* cited by examiner

Primary Examiner—King Y. Poon (57) ABSTRACT

A method and apparatus for control of a multiple copy print job involving documents in multiple languages. The method and apparatus prompt a document user to specify any languages other than that of the original document. The apparatus causes the translation of the document into the specified languages. The user may also specify how many of each translation are desired and direct copy subsets independently to specific printer trays.

12 Claims, 6 Drawing Sheets

Language of Original Document Produced: — 84

[ ]

Language to Translate Document Into:

[ ]

Number of Copies of Translated Document:

[ ]

Any Other Languages to Translate Into?

[ Yes ]     [ No ]

Second Language to Translate Document Into: — 86

[ ]

Number of Copies of Translated Document:

[ ]

Third Language to Translate Document Into:

[ ]

Number of Copies of Translated Document:

[ ]

Any Other Languages to Translate Into?

[ Yes ]     [ No ]

METHOD AND APPARATUS FOR LANGUAGE TRANSLATION OF PRODUCTION JOB OUTPUT

BACKGROUND

In recent years the expansion of computer use, the Internet and other factors have contributed to a global economy and global work environment. It is not uncommon for those in business and industry to interact on a daily basis with others in many countries. In fact, it is increasingly common for co-workers of an individual company to communicate regularly with others within the same company who are in other countries—anywhere around the world. With the increased prevalence of a global workforce and global interaction, the ability to communicate in other languages is becoming a necessity.

Further, while computer and printing technology has accelerated rapidly, in many instances the usefulness of high-speed communication devices and high-speed printers is of limited use for effecting communication of documents between users who are fluent in different languages. For example, a person may create a document in English and wish to send the document to users who understand only German. The difficulties associated with document communication may be further exacerbated in situations where the number of people and exclusive languages understood by each increase to three or more. The English document may have little or no use to correspondents who do not understand it. Of course, the document may be translated by a person who performs language translation services, but locating and enlisting the services of such skills can be a time consuming and costly process. Further, employing a translator each time a document is produced greatly reduces the efficiency associated with business and personal communication.

Alternatively, documents may be translated using a software program having language translation capabilities. Although language translation software applications are not typically as accurate as translations performed by persons skilled in language translation, language translation software tools are an attractive alternative for many computer users because the software may be used immediately upon receiving documents to quickly perform a rough translation.

Unfortunately, if a user opts to use a language translation software application to translate documents, the software program must be installed on the user's computer and the user must learn how to operate the language translation software. Moreover, when language translation software is used to translate documents, the usual single-step method of printing documents becomes a multiple step process. The additional steps may include receiving and opening the document, storing the document in a memory location on the user's computer, launching the language translation software, supplying the document to the translation software and executing the translation of the document. Further, if there are several users, each of whom need a different language translation, the document creator may have to perform the multiple steps many times. In addition, there are many printers available now for printing multiple copies, often called mopies, which can be collated. In some instances, there are needs to print mopies in several different languages for the same reasons rehearsed above, however the capability to do so is lacking.

Some existing copiers and printers are capable of evenly distributing output from a job between a plurality of trays in a collated manner. That is, it is known to collate output copies in a single language to form multi-page documents by depositing a copy of a first page of a multi-page original document in each of a plurality of output receptacles. A copy of the second page of the original is then copied and deposited into each of the output receptacles. This process continues until a complete set of all the pages of the original document is in a corresponding number of the output receptacles. Other collating methods are known. For example, it is known to produce collated output documents by depositing a complete multi-page document in a first output receptacle, then, depositing a second complete multi-page document in a second output receptacle, depositing a third complete document in a third receptacle, and so on, until the desired number of complete copies of the original have been produced. The prior art also includes a number of methods broadly dealing with document delivery to trays of document production apparatuses.

The teachings of this prior art, however, leave many problems in this field unresolved. While the printing of multiple copies has been limited in the past due to the generally higher cost of a printed page as compared to a photocopied page, technological advances have made the printing of multiple copies cost competitive as compared to photocopying. The result is that many modem printer users utilize a printer to produce multiple copies of documents. By way of example, a user may wish to print thirteen copies of an original in a first language to a first work group, four copies of the original in a second language to a second work group, nine copies of the original in a third language to a third work group, sixty-seven copies of the original in a fourth language to a fourth work group, and twenty one copies of the original in a fifth language to a fifth work group. The only known method for accomplishing these results would be to execute separate translating and printing jobs for each work group, or to execute one large print job and then manually subdivide and translate each of the respective work group copies in required numbers in subsequent steps. Further, each of these workgroups may have need for copies in two or more different languages depending on the fluency of the group members. Executing separate copy jobs, creating language translations, and/or manually separating an aggregate job is not practical when the required number of distribution sets becomes large.

These and other problems remain unresolved in the art. Thus, there is a need in the art for a system and method of producing multiple hardcopies of an electronic document in two or more languages as specified by a user.

SUMMARY

The present specification describes a system for executing a print job of an electronic document, the print job containing translations of the document into a number of languages. In one preferred embodiment, this system may include a translation module of a printer driver running on a host computer, where the translation module accepts user input specifying at least one additional language into which the document of the print job is to be translated and calls a translation program to perform translation of the document; and a printer for printing the print job including at least one hardcopy of the document translated into the additional language.

Preferably, the translation module accepts user input specifying the number of hardcopies of the document to be printed in the original and each additional specified language. The printer may include a number of output receptacles and the translation module may accept user input specifying the number of hardcopies of the document in various languages to be output to specific output receptacles. A single output receptacle may receive hardcopies of the document in a number of different languages.

The translation program may be a program residing on the host computer. Alternatively, the translation program may be a program residing on a network device on a computer network to which the host computer is connected. The host computer may also be connected to the Internet and the translation program may be a program residing on the Internet.

The present specification also describes the methods of making and using the system described above. By way of example, the present specification describes a method of executing a print job of an electronic document, where the print job contains translations in a plurality of languages of the document. This method may be performed by, in conjunction with submitting the print job to a printing device, automatically translating the electronic document into one or more languages according to user input with an electronic translation program such that the resulting print job contains hardcopies of the document in a number of languages.

The method may also include accepting user input specifying a number of hardcopies of the document to be printed in an original and each additional specified language; and specifying a number of hardcopies of the document in various languages to be output to specific output receptacles, where the printing device used provides multiple output receptacles.

Additionally, the present specification describes a printer driver stored on a medium for storing computer-readable instructions. A printer driver according to principles described herein would preferably include a user interface for accepting user input; and a translation module, wherein the translation module receives user input specifying at least one additional language into which a document of a print job is to be translated and calls a translation program to perform translation of the document.

BRIEF DESCRIPTION OF THE DRAWINGS

The foregoing and other features and aspects of the invention will become further apparent upon reading the following detailed description and upon reference to the drawings in which.

Throughout the drawings, identical elements are designated by identical reference numbers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present specification describes a system for executing a print job of an electronic document, the print job containing translations of the document into a number of languages. In one embodiment, this system may include a translation module of a printer driver running on a host computer that is generating a print job, and a printer for printing that print job including at least one hardcopy of the document translated into a second language. The translation module accepts user input specifying at least one additional language into which the document of the print job is to be translated and calls a translation program to perform the translation of the document.

As used herein, and in the appended claims, the terms "printer" and "printing device" refer expansively to all printing devices that accept a document or print job in electronic form and render hardcopy output therefrom. Thus, "printer" or "printing device" includes, but is not limited to, a laser printer, an inkjet printer, a dot-matrix printer, a thermal transfer printer, a facsimile machine, a digital copier and the like. As used herein, and in the appended claims, the term "host" or "host computer" refers expansively to any computer or electronic system that provides the electronic data of the print job to the "printer." It is within the scope of the invention for the "computer" and "printer" to be integrated into a single unit. As used herein and in the appended claims, the term "printer driver" refers to computer-readable instructions, software and/or firmware used to transfer the electronic data of the print job from the host to the printer.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Figure 1:
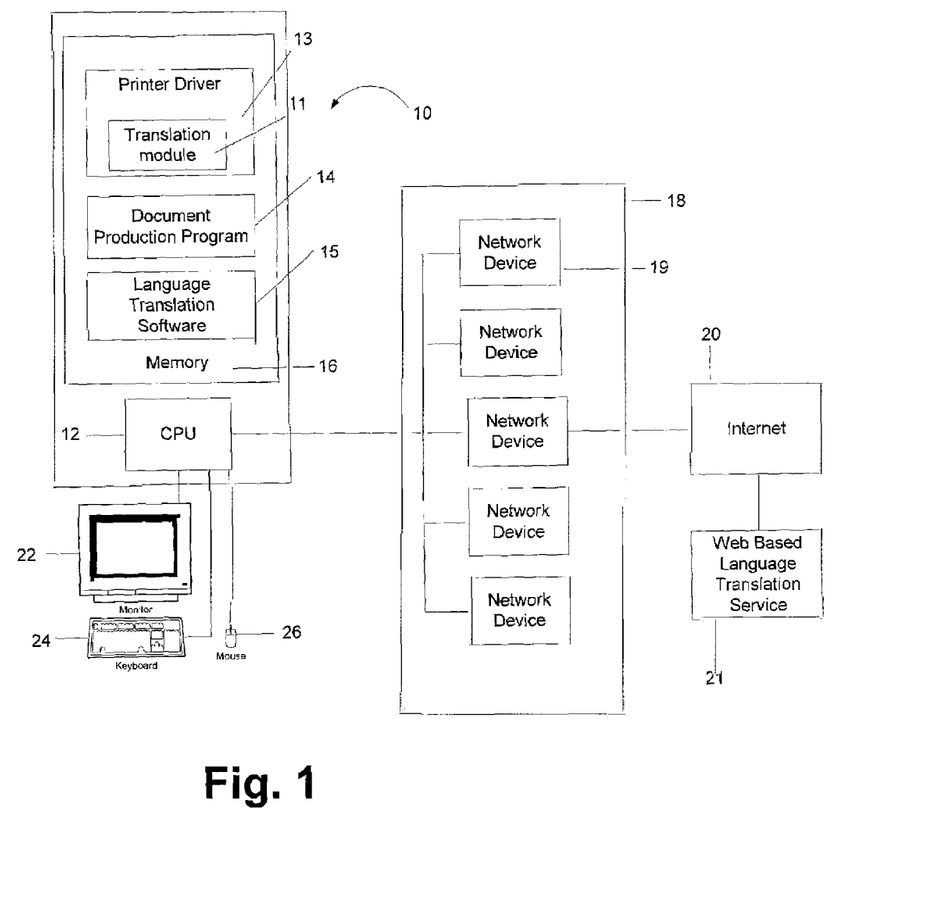
FIG. 1 is a block diagram of a computer used to store and execute a document production program and a printer driver having a language translation feature according to principles described herein.

Turning now to the drawings, and in particular to FIG. 1, one possible embodiment according to the present invention is shown. A computer 10 is shown and may include a central processing unit (CPU) 12 and a memory or data storage device 16 for storing programs that can be executed by the computer 10. These programs may include document production software 14, a printer driver 13 and language translation software 15. A monitor 22, keyboard 24, and mouse 26 enable communication between a user and the CPU 12. Although not shown in FIG. 1, the computer 10 may further include any number of peripheral devices, including, but not limited to: a printer, a modem, a scanner, a sound card, a video card, etc.

The document production software 14 may include, but is not limited to: text editors, integrated packages, word processors, spreadsheets, desktop publishers, and sign/banner programs. In some embodiments, the document production software program 14 may itself be capable of performing language translation of the document produced.

The printer driver 13 receives a document in electronic form generated by the document production program 14. The printer driver 13 performs language translation of the document according to user input as will be explained in more detail below. The printer driver 13 also formats the data of the document into print job data that can be submitted to a printer for hardcopy output.

The printer driver 13 includes a translation module 11. In some embodiments, the translation module 11 may call a language translation software application 15 that is also stored in the memory 16 to perform language translation of the electronic document output by the document production program 14. Suitable language translation software is available from a myriad of sources, including, but not limited to: Translation Experts Ltd., Mendez Co., LanguageForce Inc., NeuroTran, Translation Experts USA, and Language Partners International. Alternatively, the language translation software may be stored on any of a plurality of network devices 19, including, but not limited to: other computers, servers, memory devices, or printers; that may be connected to the CPU 12 via a communication network 18 such as a local area network (LAN) or wide area network (WAN).

In addition, it will be appreciated by those of skill in the art with the benefit of this disclosure that the network 18 may be connected to the internet 20 by any known connection including, but not limited to: a telephone modem, a cable connection, an optic connection, a DSL connection, a satellite connection, and a T1 connection. The Internet connection may provide the computer 10 with access to a web-based language translation service 21 that can be called by the translation module 11. Web-based language translation services are available, for example, from http://translate.google.com, as well as many other places easily accessible to one of skill in the art with the benefit of this disclosure.

The printer driver 13 will preferably also handle a mopy print job in which the user can selectively create a plurality of output subsets from execution of a single mopy job. Mopy jobs include the production of multiple copies of a document from an electronic "original" document. A mopy job may comprise the production of multiple copies (or output) of a document of any length. The printer driver 13 may also preferably include the capability of selectively directing the output subsets to different output receptacles.

Figure 2:
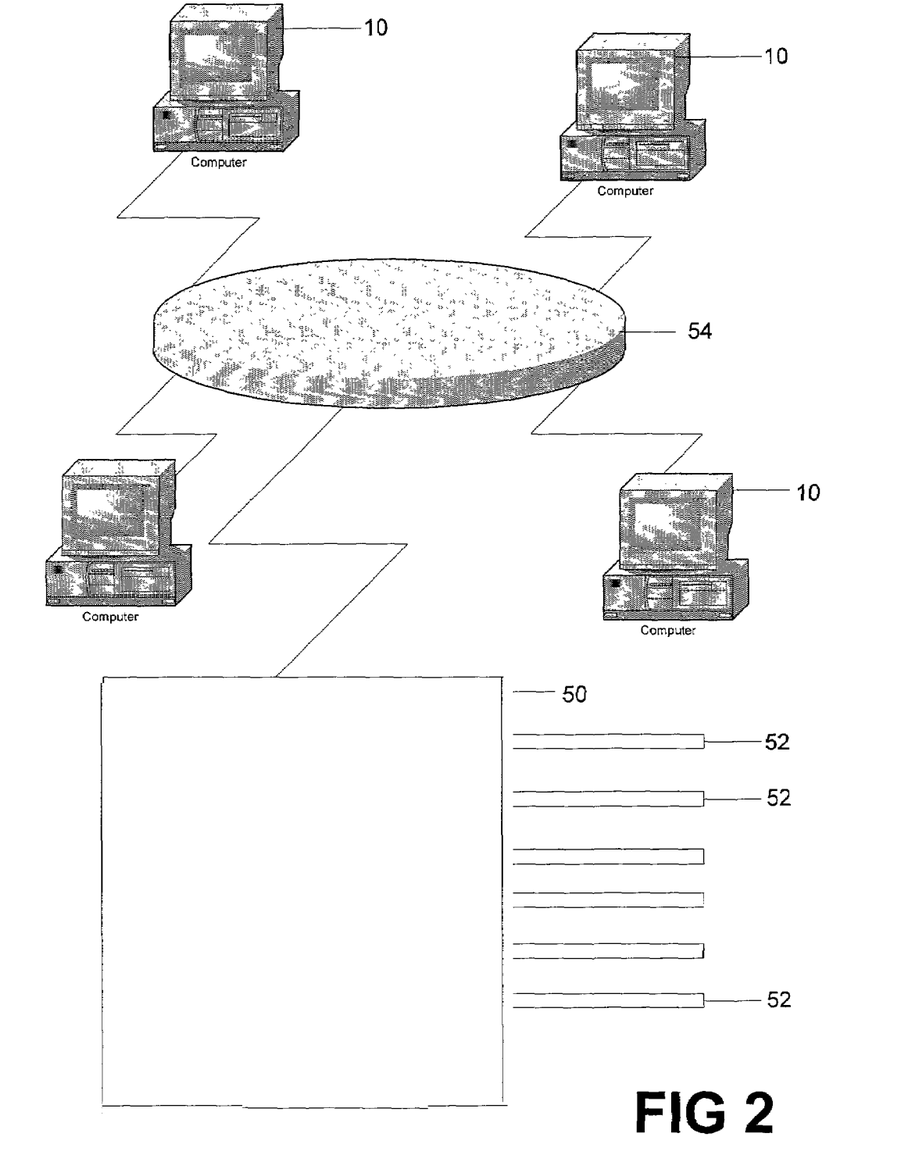
FIG. 2 is an illustration of a printer connected to a plurality of networked computers according to principles described herein.

Referring next to FIG. 2, there is disclosed a schematic diagram of a printing device or document production apparatus, for example printer 50, according to one embodiment of the present invention. Printer 50 may be designed to execute copy jobs or mopy jobs and is operatively connected to a number of host computers 10. In the embodiment of FIG. 2, printer 50 includes a plurality of output receptacles, for example, output trays 52. Trays 52 are receptive of collated or selective mopy job output. Printer 50 may be connected directly to computers 10, or connected to the user's computers via a communication network 54, such as a LAN or WAN. Printers with multiple output receptacles 52 are available from Hewlett-Packard Co. and other sources.

Figure 3:
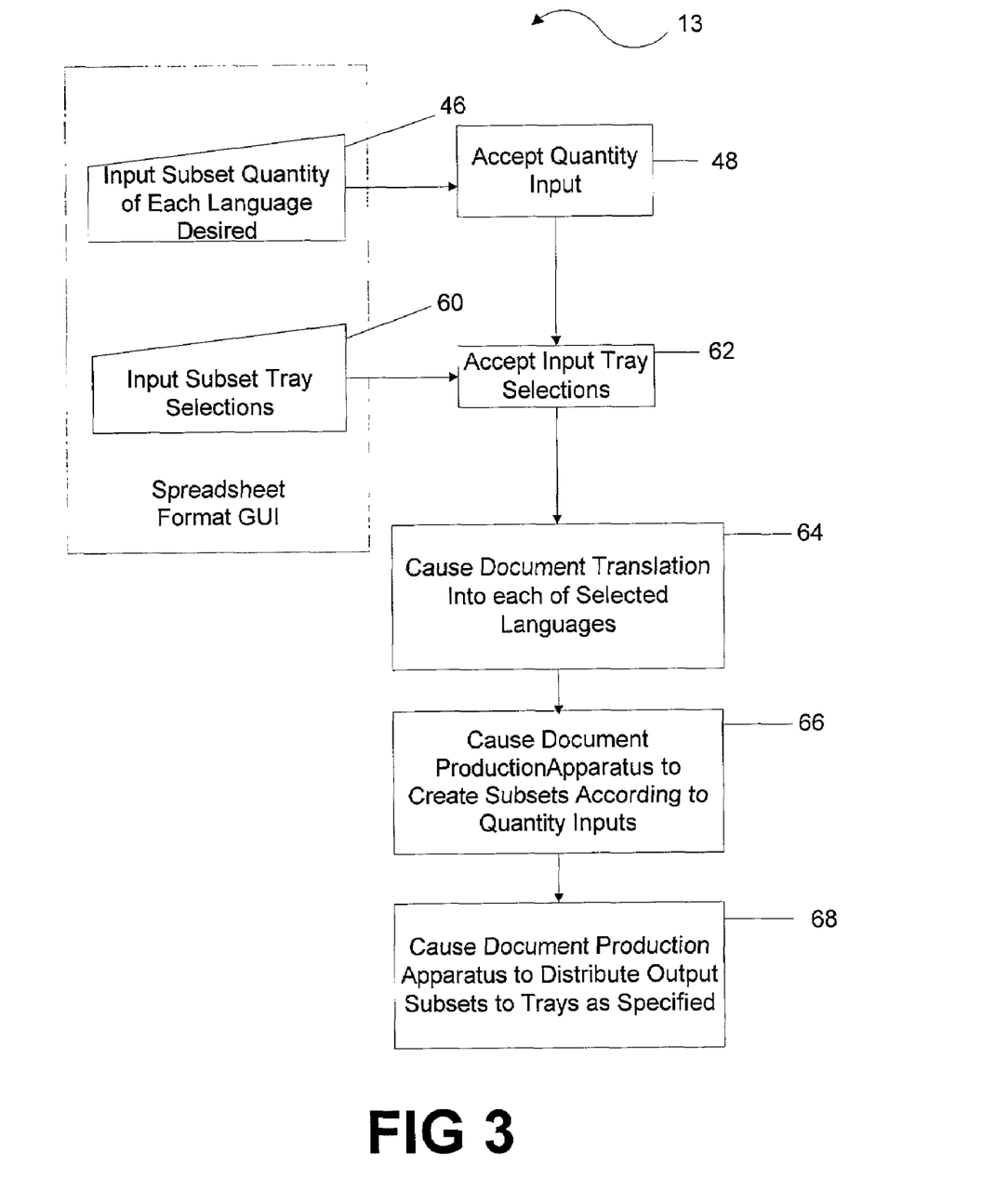
FIG. 3 is a flow chart illustrating a method for creating an automated translation feature in a multiple copy job according to principles described herein.

Referring next to FIG. 3, one program schematic for implementing a printer driver of the present invention including document translation and designation of mopy output capability is disclosed. As shown in FIG. 3, the printer driver 13, in addition to directing documents to be selectively translated, may advantageously facilitate control of the destination of the output subsets of a single mopy job. The output subsets may be selectively directed to deposit in different trays 52 (see FIG. 2) by selected entry of a user. The particular tray 52 intended for an output subset may be specified through entry of a subset tray selection 60 and accepted by printer driver 13 at box 62. In the present embodiment, the selections are preferably entered in a tabular, spreadsheet or table form through a graphical user interface (GUI), e.g., displayed on monitor 22 as shown in FIG. 1. Each of the trays 52 may have a unique identifier to facilitate the selective direction of the subsets of the mopy job.

Continuing with FIG. 3, the printer driver 13 may prompt a user or document producer to input a "subset quantity of each language desired" at block 46, that is, the number of copies of the print job that will be rendered in a specific target language in that subset of the mopy print job. The entries of a user are accepted at block 48. Specifying the "quantity of each language desired allows a user to choose how many copies of a document—produced originally in a first language—are to be translated and printed in a second language in one or more output subsets. In addition, a user may specify the number of copies of the document to be printed in any other languages as well—including the original or first language.

Similarly, the printer driver 13 may allow the user to input subset tray selections as shown at block 60. The specification of subset tray selections advantageously allows the user to specify how many copies of each document are to be sent to a particular tray. The subset tray selections further allow the user to direct any number of copies of the document in any number of languages to particular trays.

When a user has input the subset language quantity selections and tray selections for a particular mopy job, the printer driver 13 may cause the document to be translated from the first language into each of the selected languages, as designated by block 64. The program routines for effectuating the translations will be further discussed below. Following the translation (if specified) of the document, the printer driver 13 may then create output subsets in accordance with the user's selections and send each subset to a particular tray 52 independently, as designated by blocks 66 and 68. For example, a user may create or access a document and then, interfacing with printer driver 13, designate a first output subset containing five copies of the document in English and two copies in French to be sent to a first tray, a second output subset containing fourteen copies in English to be sent to a second tray, a third output subset containing one copy in German to be sent to a third tray on a separate network printer in a remote location, and a fourth output subset containing three copies in English, eight copies in Russian, two copies in Spanish, and nine copies in Portuguese to be sent to a fourth tray.

Figure 4:
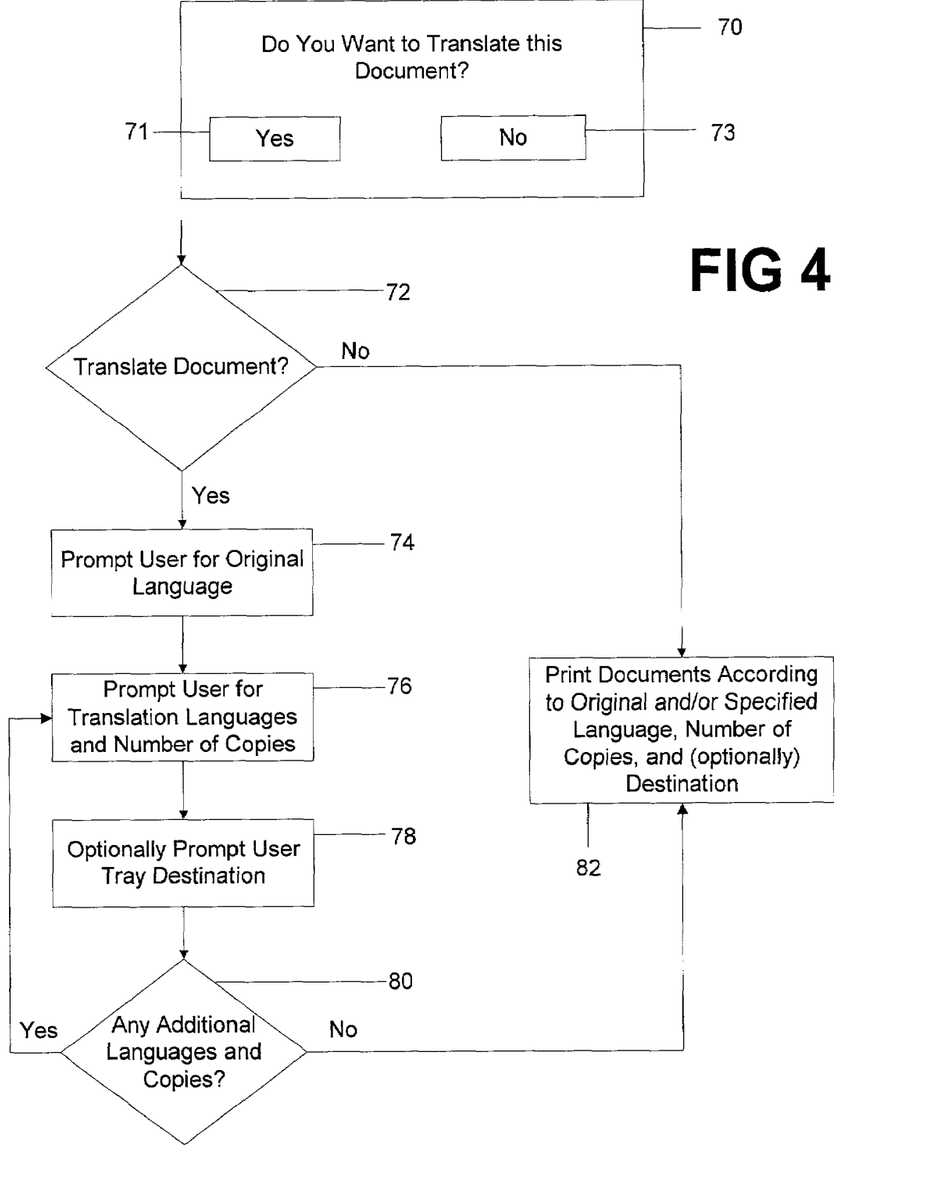
FIG. 4 is an illustration of a dialog window and flow chart that may be generated according to principles described herein.

Referring now to FIG. 4, an example of a graphical user interface according to the present invention is illustrated. Box 70 is a graphical user interface dialog box used to implement the production of a multi-lingual mopy job. As a user attempts to create a mopy job, the user interface of the printer driver 13 may execute and cause box 70 to appear on monitor 22. A program flow chart is also shown in FIG. 4. At block 72, a decision is made whether or not to translate the document from its original language. If the user answers "No" by selecting or clicking on the "No" box 73, then the printer driver 13 may prompt the user to designate the number of copies to be printed and, optionally, the tray destination or destinations of the copies.

If, however, the user indicates that she does want a translation of the document into at least one other language by selecting or clicking "Yes" box 71, the printer driver 13 may prompt the user for the original document language, represented by box 74. Alternatively, the program may assume that a default language, the primary language of the user, is the language of the original document.

Following identification of the original document language, the printer driver 13 may prompt the user for each of the languages the user desires the document to be translated into, and the number of copies of each language translation. This step is represented in FIG. 4 at box 76. Further, the user may be prompted to input the tray destination of each copy of the translated (and untranslated) documents. The tray destination selection is represented by box 78. The user may also be prompted to input any other languages she desires the document to be translated into at block 80, in the event that she has not specified all languages at step 76. If the user does desire additional language translations, the program returns to box 76 to allow the user to input additional languages. However, if the user has specified all the languages and the number of copies of each, the printer driver 13 may, at step 82, then cause the documents to be printed and sorted.

Figure 5:
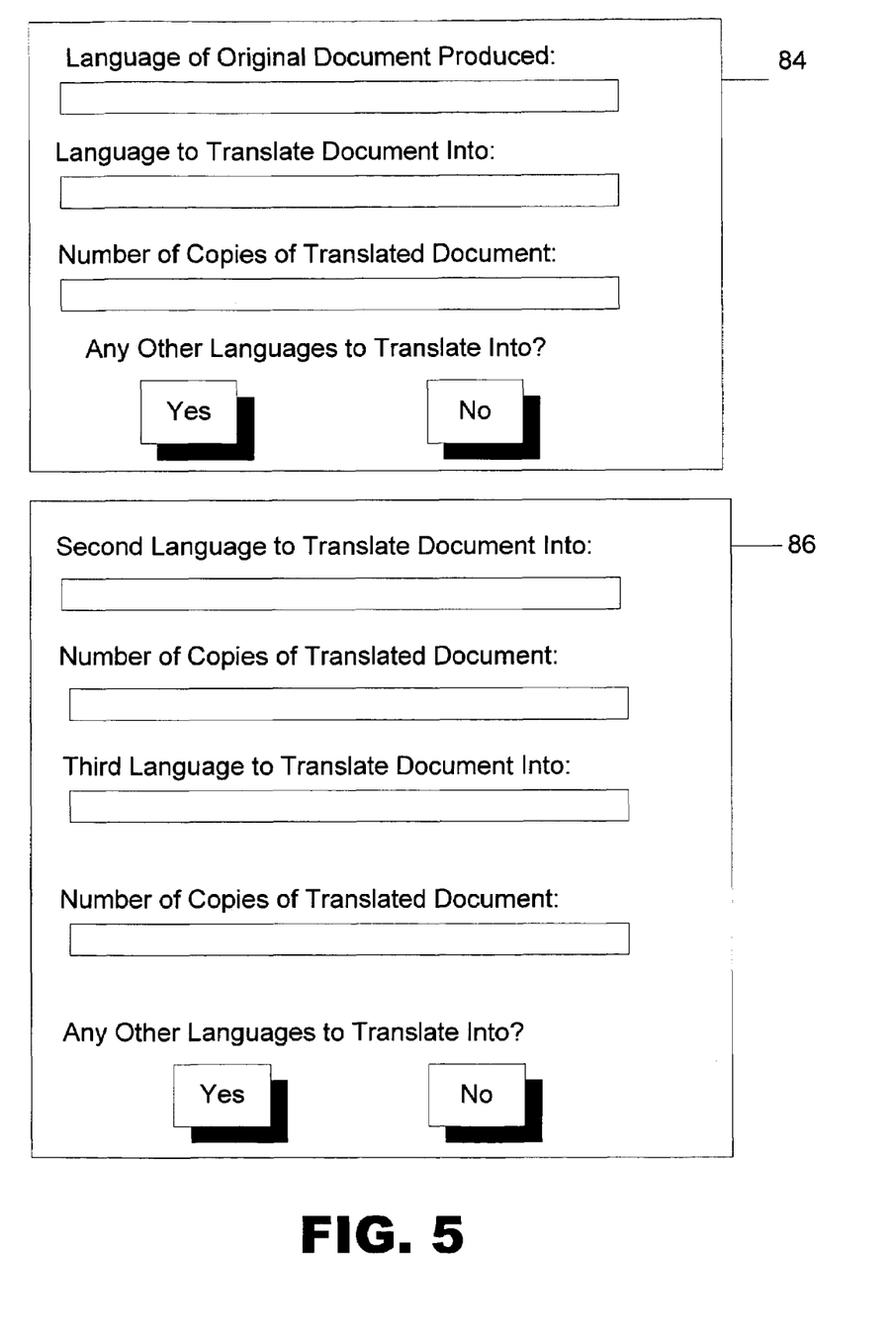
FIG. 5 is an illustration of a dialog window that may be generated according to principles described herein.

An example of the graphical interface boxes 84 and 86 that may be created to prompt the user for the original document language, the translation language, and the number of copies of the translated document desired are shown in FIG. 5. However, it will be appreciated by those of skill in the art with the benefit of this disclosure that boxes 84 and 86 are exemplary in nature and that any system may be used to prompt and/or accept input according to the languages, number of copies, and destinations of the document.

Figure 6:
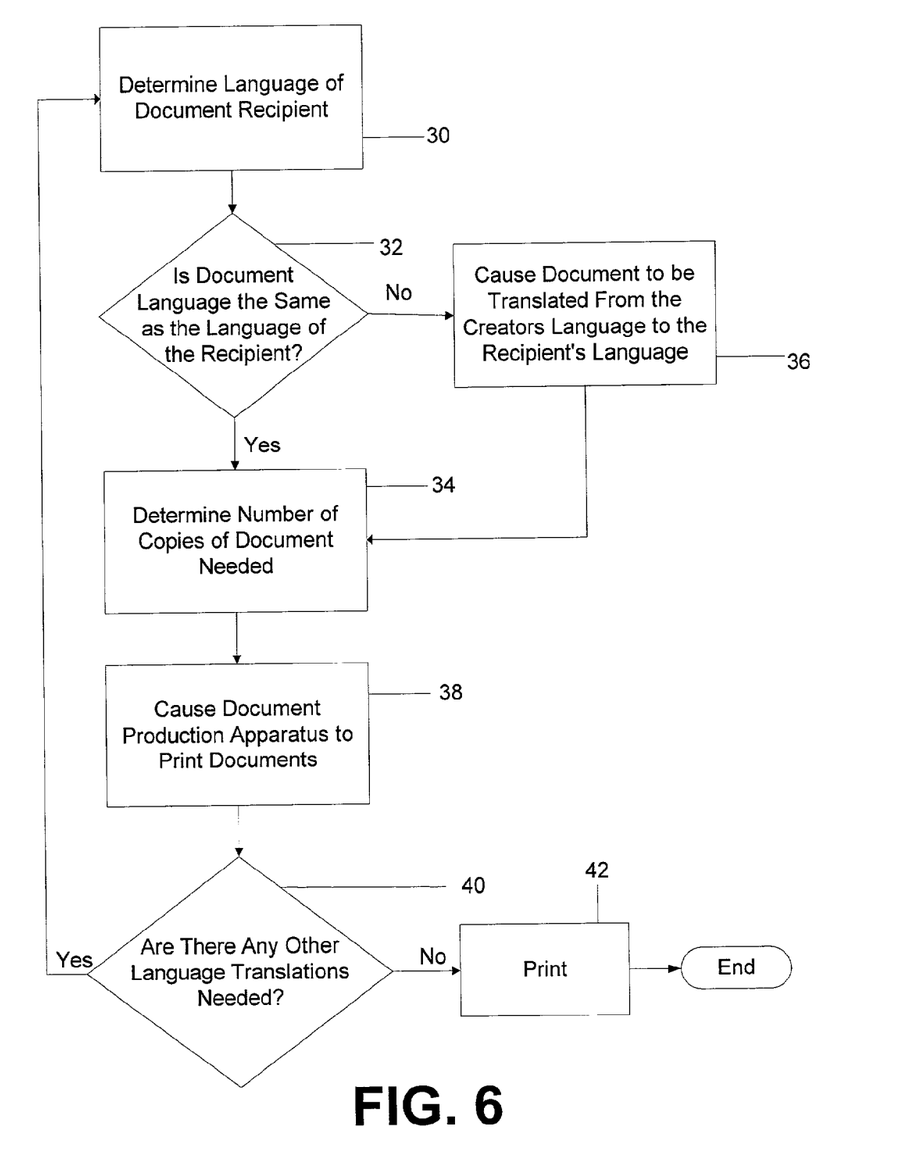
FIG. 6 is a flow chart illustrating a printer driver program embodiment according to principles described herein.

Referring next to FIG. 6, the printer driver 13 may be implemented using, for example, software code that, when executed by the CPU 12 or any other computer processor, causes a method for enabling automated translation of the document to be performed. Generally, a user or document creator determines if any desired recipients of the document communicate exclusively, primarily, or simply as a preference, in a language other than the first language the original document was created in. Block 30 represents the step of determining the language of the document recipient or recipients. In some cases there may be many recipients that prefer a language other than the first language the document was created in.

Represented by block 32, when the program has determined the language of a document recipient, a decision gate of the software code is executed, wherein the question is whether or not the first language in which the document was originally created is the same as the language preference of the intended recipient(s). In a mopy job, if the answer to the question 32 is yes, the program progresses to blocks 34 and 38, wherein the number of copies of the document in the first language is determined and printed.

If, however, the answer to question 32 is no, the program proceeds to block 36. At block 36, the program causes the document to be translated from the first language to the determined recipient's language. As described above, the translation may be implemented by document production software program 14 itself, or there may be a locally installed translation program 15 that the translation module 11 of the printer driver 13 sends the document to, or the translation module 11 may send the document to a web-based translation service via an Internet connection. Following the translation of the document, the program may proceed to block 34. At block 34, the program determines the number of copies of the document that the user desires. The number of copies may be specified according to in the original (first) language and/or the translated language(s).

When the printer driver 13 has determined the number of copies of the document needed in each particular language, it may cause printer 50 (e.g., FIG. 2) to print the documents. However, in some embodiments, the printer driver 13 may cause the document and the number of mopies needed to be saved in memory 16 until a user specifies that there are no more translations needed and the copies can be printed as a mopy job comprising a plurality of output subsets. The saving of the translations may enable the user to subsequently specify the numbers and destinations of each copy to create a collated mopy job.

At block 40, another decision may be made with regard to document production. The printer driver 13 determines whether there are any other language translations of the document that are necessary. If there are other translations necessary, the program is redirected again to block 30 for a determination of the language of the new document recipient. If there are no other language translations necessary, the printer driver 13 causes the document to be printed at block 42. The printing at block 42 may include the entire print job, or, alternatively, the printing at block 42 may be executed iteratively each time a translation of the document is made.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for executing a print job of an electronic document, said print job containing translations in a plurality of languages of said document, the system comprising:
   a translation module of a printer driver running on a host computer, wherein said translation module accepts user input specifying at least one additional language into which a document of a print job is to be translated and calls a translation program to perform translation of the document; and
   a printer for printing said print job including at least one hardcopy of said document translated into said additional language.

2. The system of claim 1, wherein said translation module further accepts user input specifying a number of hardcopies of said document to be printed in an original and each additional specified language.

3. The system of claim 1, wherein said printer comprises a plurality of output receptacles and said translation module further accepts user input specifying a number of hardcopies of said document in various languages to be output to specific output receptacles.

4. The system of claim 3, wherein at least one output receptacle receives hardcopies of said document in a plurality of languages.

5. The system of claim 1, wherein said translation program is a program residing on said host computer.

6. The system of claim 1, wherein said translation program is a program residing on a network device on a computer network to which said host computer is connected.

7. The system of claim 1, wherein said host computer is connected to the Internet and said translation program is a program residing on the Internet.

8. The system of claim 3, wherein said user input specifies a specific number of hardcopies in each of a plurality of languages to be output to each specific output receptacle.

9. A printer driver stored on a medium for storing computer-readable instructions, said printer driver comprising:
   a graphical user interface for accepting user input; and
   a translation module, wherein said translation module receives user input specifying at least one additional language into which a document of a print job is to be translated and calls a translation program to perform translation of the document.

10. The printer driver of claim 9, further comprising a distribution module for receiving user input specifying a number of copies of said document to be output in an original and each additional language.

11. The printer driver of claim 10, wherein said distribution module further receives user input specifying to which of a plurality of output receptacles in a printer receiving said print job copies of said document are to be sent.

12. A system for executing a print job of an electronic document, said print job containing translations into one or more languages of said document, the system comprising:

a translation module of a printer driver running on a host computer, wherein said translation module accepts user input specifying at least one additional language into which a document of a print job is to be translated and automatically calls a translation program to perform translation of the document; and a printer for printing said print job including at least one hardcopy of said document translated into said additional language;

wherein said translation module further accepts user input specifying a number of hardcopies of said document to be printed in an original and each additional specified language;

wherein said printer comprises a plurality of output receptacles and said translation module further accepts user input specifying a number of hardcopies of said document in various languages to be output to specific output receptacles; and wherein at least one output receptacle receives hardcopies of said document in a plurality of languages.

* * * * *

UNITED STATES PATENT AND TRADEMARK OFFICE
CERTIFICATE OF CORRECTION

PATENT NO.         : 7,095,513 B2                                              Page 1 of 1
APPLICATION NO. : 09/976078
DATED              : August 22, 2006
INVENTOR(S)        : Gary Stringham It is certified that error appears in the above-identified patent and that said Letters Patent is hereby corrected as shown below:

In column 8, line 44, in Claim 1, after "input" insert -- through a graphical user interface --.

Signed and Sealed this

Eleventh Day of August, 2009

David J. Kappos
*Director of the United States Patent and Trademark Office*